United States Patent [19]

Bassi

[11] 4,455,048
[45] Jun. 19, 1984

[54] SEATS WITH A DEVICE FOR LOCKING THE INCLINATION OF THE SEAT BACK

[75] Inventor: Alberto Bassi, Turin, Italy

[73] Assignee: ITW Fastex Italia S.p.A, Turin, Italy

[21] Appl. No.: 386,126

[22] Filed: Jun. 7, 1982

[30] Foreign Application Priority Data

Jun. 11, 1981 [IT] Italy .................... 22254 A/81

[51] Int. Cl.³ .................... A47C 1/024; G05G 5/06
[52] U.S. Cl. .................... 297/367; 297/370; 74/540
[58] Field of Search .................... 297/366–371, 297/361, 353; 74/533, 535, 537, 540, 541, 536

[56] References Cited

U.S. PATENT DOCUMENTS

| 642,304 | 1/1900 | Dobler | 74/536 |
|---|---|---|---|
| 3,272,555 | 9/1966 | Barecki et al. | 297/369 |
| 3,720,443 | 3/1973 | Mourgue | 297/353 X |
| 4,036,525 | 7/1977 | Howk | 297/353 |
| 4,189,957 | 2/1980 | Geoig et al. | 74/537 X |
| 4,384,742 | 5/1983 | Wisniewski | 297/353 |

FOREIGN PATENT DOCUMENTS

| 874736 | 8/1961 | United Kingdom | 297/366 |
|---|---|---|---|
| 1371641 | 10/1974 | United Kingdom | 297/353 |

*Primary Examiner*—William E. Lyddane
*Assistant Examiner*—Peter Brown
*Attorney, Agent, or Firm*—J. R. Halvorsen; T. W. Buckman

[57] ABSTRACT

A device for locking a seat back in desired predetermined positions comprises a slider 3 slidable in a slideway 2 provided in the seat base 1, 1' and pivoted at one end to a connecting rod 9 which connects the slider to the seat back 10, and locking pawl 6 fixed to an axle 21, to which is also fixed a handle 8. The slider and the pawl are provided with series of arcuate teeth 4, 4' and 5, 5' capable of meshing with one another, and the pawl is urged by a spring 7 into mesh with the slider, and can be disengaged manually from the slider by means of the handle 8.

4 Claims, 4 Drawing Figures

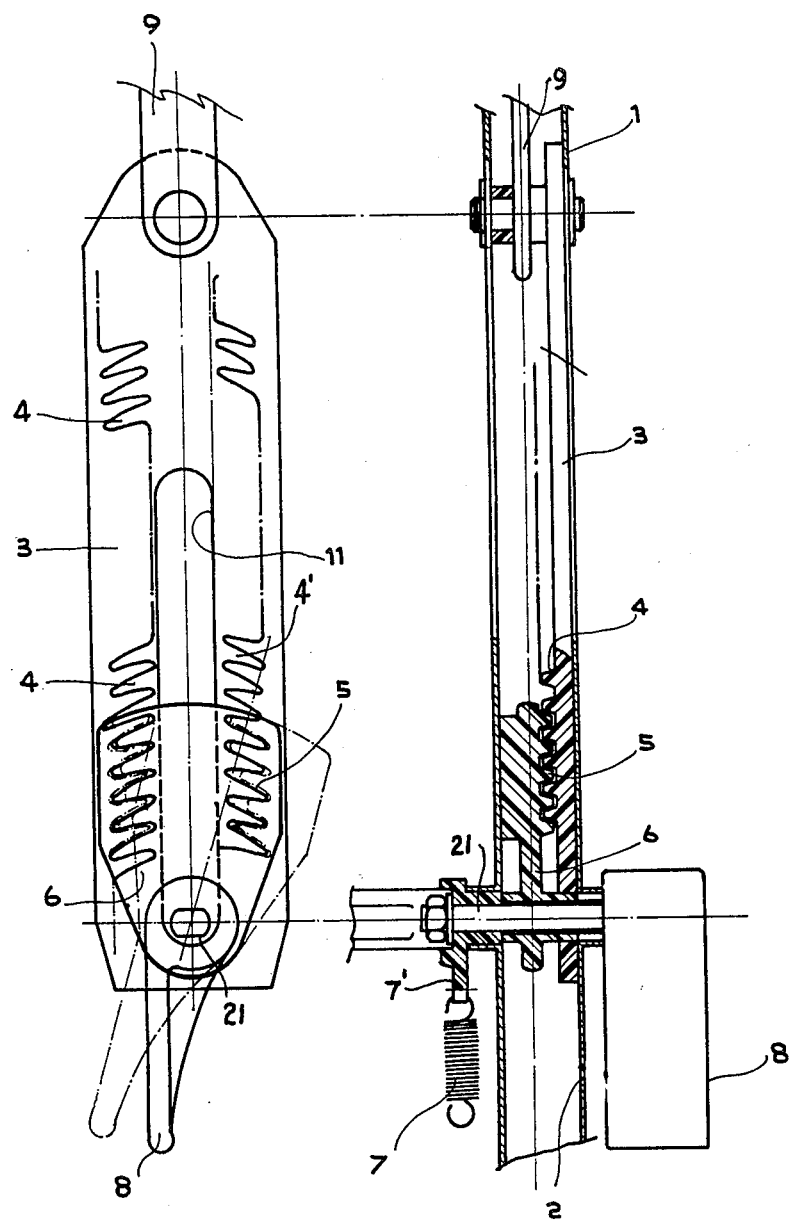

SEATS WITH A DEVICE FOR LOCKING THE INCLINATION OF THE SEAT BACK

The present invention relates to devices for locking a seat back, particularly of a seat for a motor vehicle, in positions having a desired inclination.

The prior art devices of this kind have the disadvantage that they do not permit fine adjustments of the position of the back as is required at present by most motor vehicle manufacturers.

In addition, in the prior art devices, repeated actuations cause wear and so generate clearances in the mechanism controlling the inclination of the back which cannot be taken up, thus rendering the back no longer rigidly connected to the seat.

The invention aims to obviate these disadvantages by providing devices which permit a sufficiently fine adjustment of the position of the back, such as to meet the present requirements in this field, and which at the same time avoid too rapid wear of the components of the device.

According to the present invention a seat includes a device for locking a seat back in positions having a desired inclination, and comprises a slider slidable in a slideway provided in a seat base and pivoted at one end to a connecting rod which connects the slider to the seat back, and a locking pawl fixed to an axle which is journalled in the seat base and to which is also fixed a handle, the slider and pawl being provided which series of arcuate teeth capable of meshing with one another, and the pawl being urged by a spring into mesh with the slider so as to lock it in the desired position in the slideway, and being able to be disengaged manually from the slider by means of the handle.

The locking device in seats according to the invention is simple to manufacture and to install, is rugged and easy to control, and in addition its cost is comparatively low, especially if its components are made of a plastics material.

A preferred construction comprises two identical sliders arranged parallel to and facing one another and having each, on its face facing the other slider, a series of teeth which is a mirror image of the series of teeth on the other slider, the locking pawl being arranged between the two sliders and having a series of teeth on its two opposite faces, each capable of meshing with the series of teeth on a respective slider.

The invention will be better understood from the following detailed description, given merely by way of example and therefore in no limiting sense, of two embodiments thereof, referring to the accompanying drawings, in which:

FIG. 2 is a side view of the locking device;

FIG. 3 is a longitudinal cross-sectional top view of the locking device; and

Figure 1:
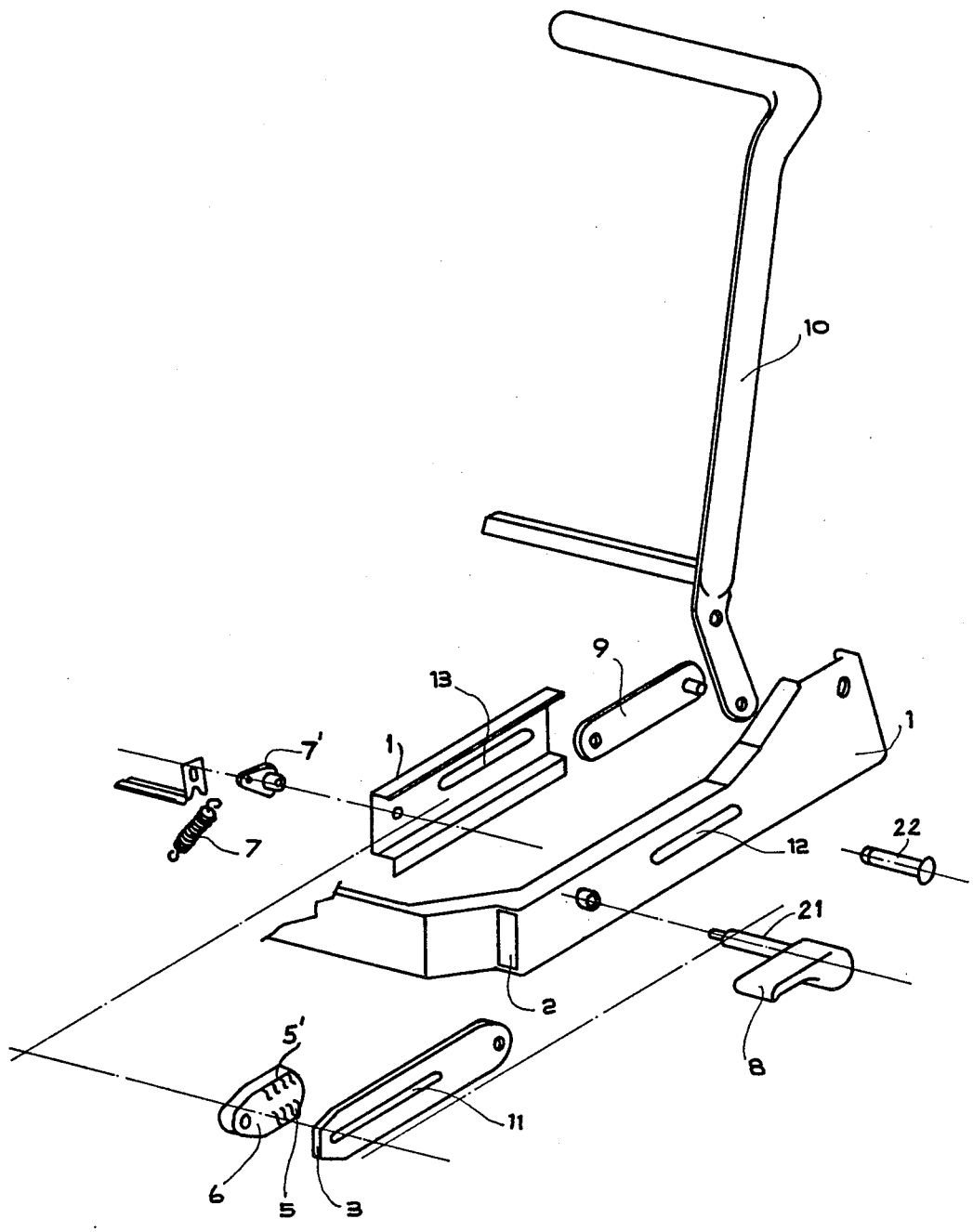
FIG. 1 is a perspective exploded view of one locking device, with the seat base and seat back structures.

Referring to FIGS. 1 to 3, it is seen that a seat base structure includes a main member 1 and a cooperating member 1' which, in the assembled condition as shown in FIG. 3, together define a slideway 2 in which the slider 3 can slide. Said slider has on one of its faces two series of teeth 4, 4'. In the Figures there is shown for the sake of simplicity only a portion of each series 4, 4' although it is understood that it extends along almost the whole length of the slider. (In FIG. 2 for compactness the slider 3 is drawn with its length vertical; when installed, the length is horizontal, as indicated in FIG. 1). The teeth of each series 4, 4' have arcuate shapes so as to mesh with two series of teeth 5, 5' provided on one face of a pawl 6.

The pawl 6 is pivoted to the seat base 1 by being fixed to an axle 21 which is journalled in the members 1, 1'. Also fixed to the axle 21 are a handle 8 and a lever 7'. By rotating the pawl in one direction (anticlockwise in FIG. 2) it can mesh its teeth, 5, 5' with the corresponding teeth 4, 4' of the slider 3, and by rotating it in the opposite direction (clockwise in FIG. 2) it can disengage from the slider 3.

A return spring 7, acting on the lever 7', causes the pawl, when it is not disengaged manually from the slider 3 by actuating the handle 8 connected to the pawl, to be always engaged with the slider 3 so as to keep it in a given position. As a result, there will correspond to said position of the slider 3 a given position of a connecting rod 9 linking the slider 3 to a seat back structure 10, so that the latter will be kept in a position having a desired inclination.

Should it be desired to change said inclination, it will be sufficient to manually rotate the pawl 6 by means of the handle 8 so as to disengage it from the slider 3, whereupon the back can be rotated so that it takes a new desired inclination position.

On then releasing the handle 8, the pawl 6, due to the return spring 7, will again engage the slider 3 and lock the seat back in the position it has reached.

The axle 21 carrying the pawl is journalled in the seat base structure 1, 1' in such a position that the axle must, for constructional reasons, pass through the slider 3. As a result, there is provided in said slider 3 a longitudinal slot 11 to allow the sliding of the slider in the slideway 2 in spite of the presence of the axle 21.

In the described embodiment there are also provided two opposite longitudinal slots 12 and 13 in the sides of the slideway 2, to enable a pin 22 connecting the connecting rod 9 to the slider 3 to shift together with said slider, and to make the installation of the device easier.

Figure 4:
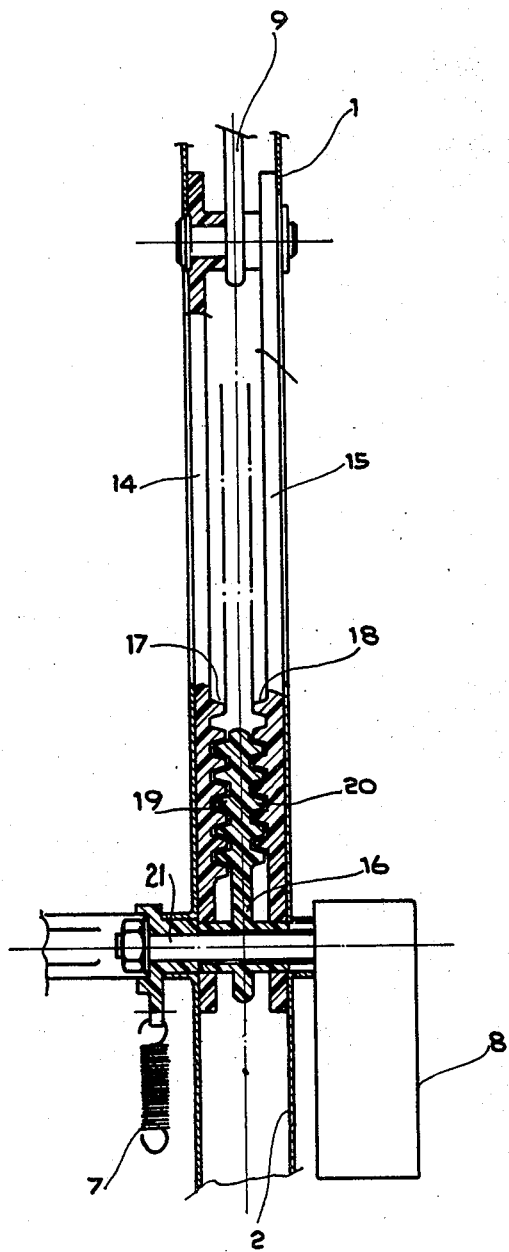
FIG. 4 is a longitudinal cross-sectional top view of a modification of the locking device.

In FIG. 4 there is shown a modification of the device in which there are provided two mirror-image parallel and spaced apart sliders 14 and 15 between which a pawl 16 is arranged. Each of said sliders has on its face facing the other slider a series of teeth 17, 18 respectively, which meshes with a series of teeth 19, 20 respectively, on opposite faces of the pawl 16. A first advantage of the device according to FIG. 4 is that the engagement of the pawl with two sliders instead of a single slider as in the first embodiment described makes it possible to share the forces involved between said sliders so that the load on the meshing teeth is halved.

Another advantage is that, since the pawl is arranged between the two sliders and not offset with respect to a single slider as in the first embodiment, no torques are generated tending to twist the pawl and disengage the meshing teeth.

I claim:

1. A seat including a device for locking a seat back in position having a desired inclination, and comprising a slider member slidable in a slideway provided in a seat base and pivoted at one end to a connecting rod which connects the slider member to the seat back, and a locking pawl member fixed to an axle which is journalled in the seat base and to which is also fixed a handle, said slider and pawl members each including a broad flat face in opposition to the other and each having at least two generally parallel series of arcuate teeth extending upwardly from said flat face and which movably mesh with a plurality of arcuate teeth in the opposing member's respective series of teeth, and said pawl member being resiliently urged by a spring into mesh with said slider so as to lock it in the desired position in the slideway, and being able to be disengaged manually from said slider member by means of said handle.

2. A seat as claimed in claim 1, in which said slider member has a closed ended slot for clearing the axle of said pawl member and handle to permit limited sliding movement of said slider member.

3. A seat as claimed in claim 1, comprising two identical sliders arranged parallel to and facing one another and having each, on its face facing the other slider, a series of teeth which is a mirror image of the series of teeth on the other slider, the locking pawl being arranged between the two sliders and having a series of teeth on its two opposite faces, each capable of meshing with the series of teeth on a respective slider.

4. A seat as claimed in claim 3 wherein the opposing faces of each of said sliders and said pawl include a pair of parallel series of arcuate teeth.

* * * * *